(No Model.) 4 Sheets—Sheet 1.
J. H. COOMBS.
PANNING AND CONCENTRATING MACHINE.
No. 592,238. Patented Oct. 26, 1897.

Witnesses:
Oscar F. Hill
Robert Wallace

Inventor:
John H. Coombs,
by W. A. Copeland,
Attorney.

(No Model.) 4 Sheets—Sheet 4.
J. H. COOMBS.
PANNING AND CONCENTRATING MACHINE.

No. 592,238. Patented Oct. 26, 1897.

Witnesses:
Oscar F. Hill
Robert Wallace

Inventor:
John H. Coombs
by W. A. Copeland.
Attorney.

THE NORRIS PETERS CO., PHOTO-LITHO., WASHINGTON, D. C.

UNITED STATES PATENT OFFICE.

JOHN H. COOMBS, OF BOSTON, MASSACHUSETTS.

PANNING AND CONCENTRATING MACHINE.

SPECIFICATION forming part of Letters Patent No. 592,238, dated October 26, 1897.

Application filed September 17, 1896. Serial No. 606,141. (No model.)

*To all whom it may concern:*

Be it known that I, JOHN H. COOMBS, a citizen of the United States, residing at Boston, in the county of Suffolk and Commonwealth of Massachusetts, have invented certain new and useful Improvements in Panning and Concentrating Machines, of which the following is a specification, reference being had to the accompanying drawings, which form a part hereof.

My invention relates to machines for separating the gold from the sand in placer-mining, and also for concentrating ores, especially gold, and has for its main objects to give to the pan a rapidly vibrating and swiveling motion simultaneously, and to automatically tip the pan at regular intervals to pour off the water and debris, and then restore the pan to its normal position; also to construct the pan with a pocket which prevents the gold or ore in the bottom from being poured off with the water, and to cut off the flow of water into the pan when the pan is tipped.

The invention consists in certain novel features which will be described, and which will be more particularly pointed out in the claims at the end of the specification.

Figure 1:
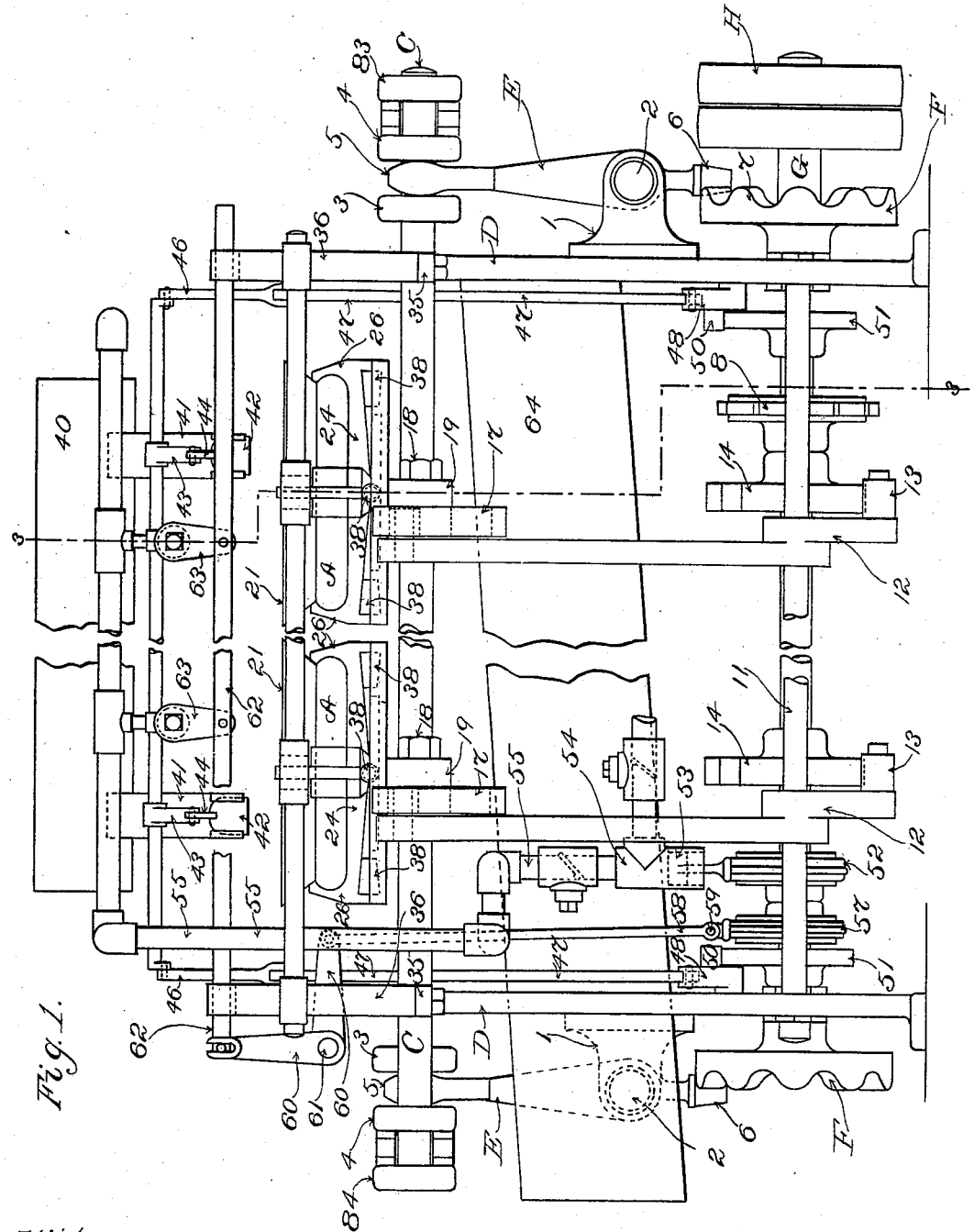
Figure 2:
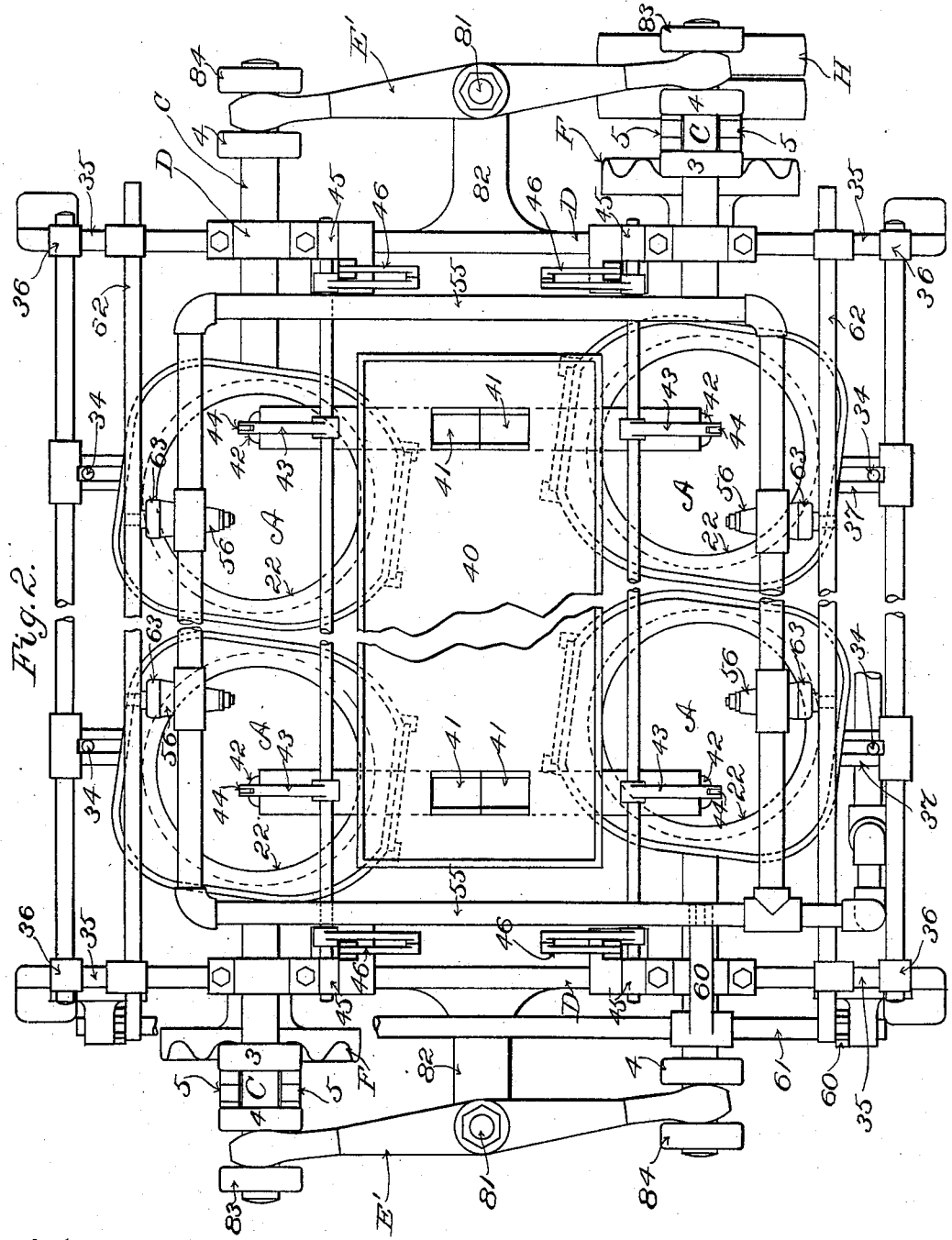
Figure 3:
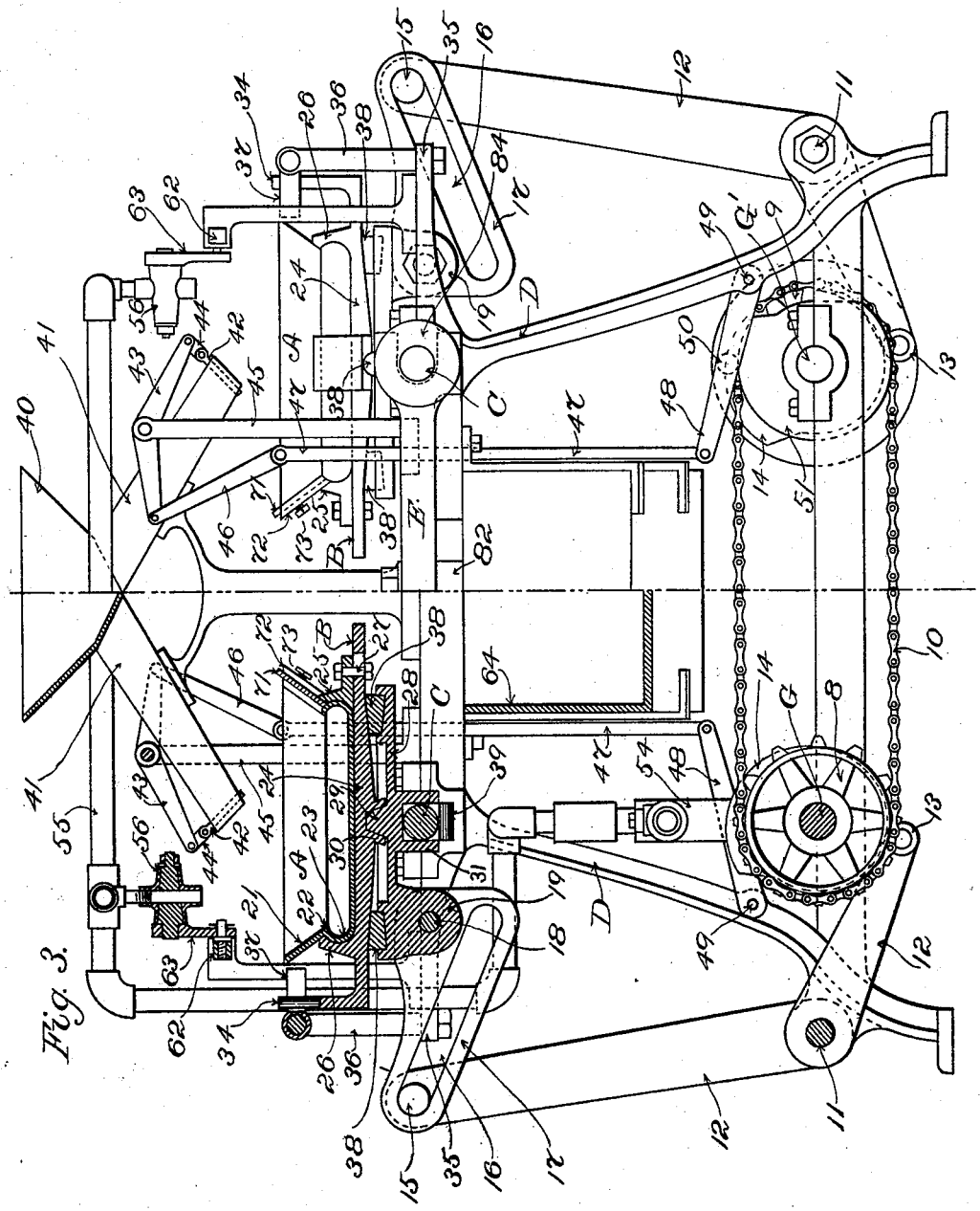
Figure 4:
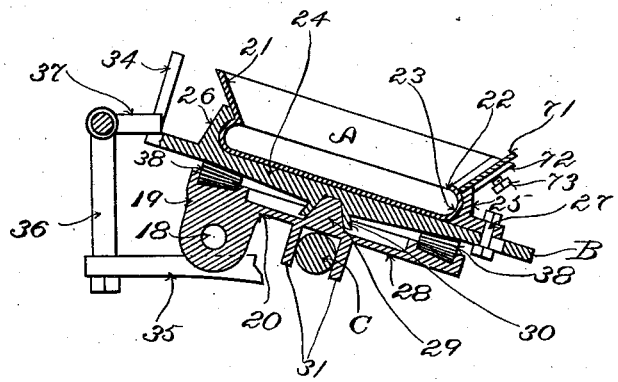
Figure 5:
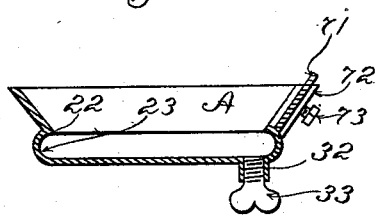
Figure 6:
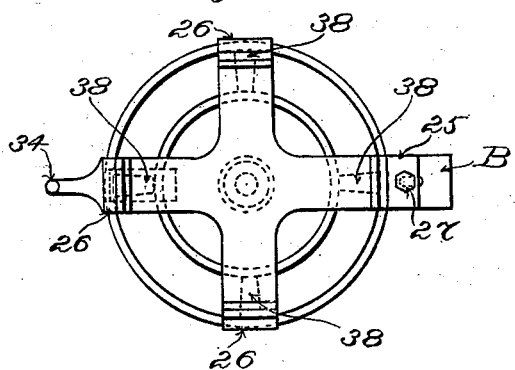

In the drawings, Figure 1 is a side elevation of a machine embodying my invention, the middle portion being broken away. Fig. 2 is a plan. Fig. 3 is an end view partly in section. Fig. 4 is a detail section of the pan and its holding and supporting frame. Fig. 5 is a section of the pan detached. Fig. 6 is a plan of the holding and supporting frame with the pan removed.

I have shown in the drawings two series of pans with two sets of operating connections, the machine being represented as broken away and showing only the two end pans in each series. In practice a larger number of pans would usually be employed, although the essential features of the invention might be embodied in a machine having but a single pan. The pans are held in frames axially pivoted and supported on shafts which are rapidly reciprocated, thereby giving a vibratory movement to the pans, the reciprocation being effected by rotary cams and intermediate connection with said reciprocating shafts, the cams causing a certain number of vibrations of the pans at each revolution of the driving-shaft, and the pans being tipped once at each revolution of the driving-shaft by means of rotary cams operated by said shaft and suitable connecting mechanism. The frames which hold and support the pans are formed with a compound base portion of which I call the upper portion the "holding-frame" and the lower portion the "supporting-frame," the lower portion being supported on the shaft, as already mentioned, and the upper portion having a swiveling movement on the lower portion, so that as the pan vibrates in a straight line it has at the same time a rapidly-alternating swiveling movement on its axis, and has a tipping movement once at each revolution of the driving-shaft.

The pans A are held in frames B, pivoted on shafts C, which are mounted in suitable bearings in the main frame D and have a reciprocating movement. There is one of these reciprocating shafts for each series of pans. Levers E, pivoted at 2 in brackets 1, secured to the frame D, are forked at their upper ends. The forked branches 5 embrace the shafts C between the two bosses 3 4 and are rounded on their contact sides to allow for the oscillating movement of the levers on their pivots. The vibration of said levers causes a reciprocation of the shafts C. The lower arms of the levers have cam-rolls 6, which engage with the open face-cams F. These cams are fixed on the rotating shafts G G', the shaft G being the main driving-shaft and having thereon the driving-pulley H, and the shaft G' being driven by suitable connection with the main shaft G. I have shown for this purpose a chain-and-sprocket connection, the sprocket 8 being fixed to the driving-shaft G, and the sprocket 9 being fixed to the driven shaft G', and the two sprockets connected by the chain 10. It is obvious that there are well-known substitutes or equivalents for the chain-and-sprocket connection described. As the shaft G revolves, the levers E and shafts C are reciprocated back and forth, thereby reciprocating the pans each time the cam-rolls 6 pass over one of the projections 7 on the cams F.

To insure greater steadiness of action, I locate one of the cams F and its lever E at the right-hand end of the driving-shaft, and I locate the other cam F and its lever E at the left-hand end of the driven shaft G', and connect the reciprocating shafts C C by the forked levers E' E', pivoted at 81 to the brackets 82, the fork on one end of said levers E' embracing the shafts C C between the bosses 4 and 83, and the fork at the other end embracing said shafts between the bosses 4 and 84.

Pivoted on the rods 11 in the lower part of the frame are bell-crank levers 12, having at the ends of the lower arms rolls 13, which engage with cams 14, fixed on shafts G G'. At each revolution of the shafts the rolls 13 ride up on the cams, tipping the bell-cranks 12 until the rolls reach the height of the incline, which then slide off, bringing back the bell-crank to its first position. Projecting from the end of the upper arm of the bell-crank 12 is a pin 15, which engages with the guide-slot 16 in the link 17, and said link 17 is bolted at 18 to the boss 19 on the bottom 20 of the pan-holding frame. When the bell-crank 12 rides up on the cam, it turns forward on its pivot, carrying the pin 15 forward in the guide-slot 16 and lifting the link 17 and tipping the entire compound pan-holder and supporting-frame. The link 17 can be adjusted by means of its bolt 18 to different angles, so that a varying degree of tip may be given to the pan, according to the material to be panned.

The pans A have preferably an upper portion 21, flaring outwardly from the waist or lip 22 up, and a lower portion 23, which spreads outwardly from the waist 22 down, forming a marginal pocket, so that when the pan is tipped to pour off the water and the debris the gold and concentrates in the bottom of the pan will be prevented from passing out. I prefer to form this lower portion with concave sides, as shown, but the essential feature is the inward projection at 22 to form a marginal pocket for the concentrates when the pan is tipped. The pans are held in frames B, which have a base 24 and grooved clamping-flanges 25 and 26, which clamp the pan. One of these flanges 25 should be separable from the base, so that the pan may be inserted in position, after which the clamp 25 is placed in position and secured to the base 24 by a bolt 27. In the bottom of the pans, near the edge, is an outlet 32, closed by a plug 33. Through this outlet the concentrates are withdrawn when desired. In one side of the pan there is a gate 71, which slides in guides 72 and may be raised or lowered to vary the rate of flow of the material from the pan. If the debris is coarse and it is desired to pour off quickly, the gate is lowered. When the debris is mostly fine sand, the gate is kept in its more elevated position. A set-screw 73 holds the gate in its adjusted position. The lower part of each of the pan-supporting frames consists of a plate 28, mounted on one of the reciprocating shafts C and having on the upper side a cone 29, on which as an axis the upper part of the pan-holder is centrally pivoted, the cone fitting in the socket 30 in the under side of the base 24. The downwardly-projecting flanges 31 on the under side of the plate 20 embrace the shaft C and preferably clamp it firmly, the shaft C having a movement on its axis as well as a reciprocating movement, so that when the pan-holder tips the shaft C rolls also. The rolling movement of the shaft C may, however, dispensed with and the frame roll on the shaft.

The upper part of the pan-holder is loosely pivoted on one side, so that when the shaft C is reciprocated not only will the entire frame and pan be reciprocated with the shaft, but the base 24 and therefore the pan will have an alternating rotary vibration on its axis. The pivoting device which I employ is as follows: On one side of the base 24 is the upwardly-projecting pin 34. In an arm 35 of the main frame is a vertical post 36, having at its upper end a forked arm 37, between the branches of which extends the pin 34. The slot between the branches of the fork allows the pin 34 to turn as a pivot and also to move up and down as the pan tips, and to move in and out, according to the reciprocation of the pan and shaft C. Antifriction-rolls 38 are preferably employed both to aid in supporting the upper part of the frame and steady it on the conical axis 29. Antifriction-rolls 39 also are preferably employed beneath the reciprocating shafts C.

The action of the pans is such that they can be employed in amalgamating and concentrating at the same time, and they can be used instead of amalgamating-plates in stamp-mills and in reduction-mills, for it is well known that all refractory ores have more or less free fine gold which is lost by being washed away by the present methods in use.

The gold-bearing sand or crushed ore is fed into the hopper 40, whence it passes to the several pans through the chutes 41. The outlets of the chutes are controlled by the gates 42, which are actuated by means of the cams 51 on the shafts G G' through suitable intermediate connecting mechanism. Such intermediate mechanism, as shown in the drawings, consists of the following devices: The gate 42 is pivoted to one arm of the bell-crank 43 by link 44, said bell-crank being pivoted to a rod having its bearing in the standard 45, fixed to the main frame. To the other end of the bell-crank 43 is pivoted a link 46, connected with the vertical rod 47, which is pivoted at its lower end to the arm 48, said arm 48 being pivoted at its other end to the main frame at 49. Projecting from this arm 48 is a roll 50, which engages with the cam 51. The cam is adjusted so that the gate is closed when the pan tips at each revolution of the shaft.

Mounted on the shaft G is an eccentric 52, which operates a piston 53 of a pump 54 to pump water into the pipes 55, which supply the pans. The eccentric is so adjusted that the valves are opened and closed once at each revolution of the shaft, the valves being closed when the pans tip. The water is supplied to the pan through cocks 56, which are opened and closed by means of the eccentrics 57 through intermediate mechanism, the cocks being closed when the pans tip. The intermediate mechanism shown in the drawings is as follows: A rod 58 is connected at one end by the pin 59 to the eccentric and is connected at the other end to the bell-crank 60, pivoted at 61 to the main frame. The upper end of the bell-crank 60 is pivoted to the slide-rod 62, to which are pivoted the crank-arms 63, which operate the cocks 56. The water and debris are dumped from the pans into the trough 64 and conducted away.

What I claim is—

1. In combination with a pan, a holder therefor in which the pan is detachably clamped, a supporting-frame on which the said holder and pan are axially pivoted, a shaft to which said supporting-frame is fixed, mechanism which rapidly reciprocates said shaft and pan in a straight line longitudinally with said shaft, a guide which pivotally engages with said pan-holder and gives to the pan a rapidly-alternating rotary motion on its axis simultaneously with the straight-line movement, and mechanism which rocks the shaft and tips the pan after a certain number of longitudinal reciprocations and alternating rotary motions, substantially as described.

2. In combination with a pan, a holder therefor, a supporting-frame on which the said holder and pan are axially pivoted, a shaft to which said supporting-frame is fixed, a driving-shaft, a cam with a series of projections thereon rotated by said driving-shaft, a pivoted lever one end of which engages with said cam and whose other end is connected with said reciprocating shaft so that the shaft and pan are reciprocated back and forth in a straight line at each revolution of the driving-shaft as many times as the cam end of the lever rides over a projection on the rotating cam, a guide which pivotally engages with said pan-holder and gives to the pan a rapidly-alternating rotary motion on its axis simultaneously with the straight-line movement, and mechanism actuated by said driving-shaft which tips the pan after a fixed number of reciprocations of the pan and then restores it to its normal position, substantially as described.

3. In a panning and concentrating machine, in combination with a pan, a driving-shaft and intermediate mechanism through which a vibratory movement is imparted to the pan, intermediate mechanism by which the pan is tipped after a fixed number of vibrations, a hopper which feeds to the pan, a gate which controls the outlet of the hopper, and mechanism actuated by the driving-shaft to close the gate of the hopper when the pan is tipped and open the gate after the pan is restored to its normal position, said gate-operating mechanism consisting of a bell-crank pivoted to a fixed portion, one arm of the bell-crank being flexibly connected to said gate and the other arm having a link-and-rod connection with an arm pivoted to a fixed support, a cam on the driving-shaft which engages with the said arm and so adjusted as to actuate the described intermediate mechanism to open and close the gate, substantially as described.

4. In a panning and concentrating machine, in combination with a pan, a supporting-frame on which said pan is pivotally supported on its axis, a reciprocating shaft on which said pan is supported and which imparts a reciprocating movement to said pan, a driving-shaft, a cam with a series of projections thereon rotated by said driving-shaft, a lever with a cam end which engages with said projections on the rotating cam and whose other end is connected with said reciprocating shaft so that the pan is reciprocated backward and forward as many times during each revolution of the driving-shaft as there are projections on the cam, a guide which pivotally engages with said pan on one side thereof, thereby giving the pan an alternating swiveling movement simultaneously with its reciprocating movement, a second cam actuated by said driving-shaft, and intermediate mechanism actuated by said last-mentioned cam to tip the pan after a fixed number of vibrations, substantially as described.

5. In a panning and concentrating machine, in combination with a pan, mechanism for imparting a straight-line reciprocating movement to the pan, mechanism for imparting an alternating swiveling movement to the pan simultaneously with the reciprocating movement, mechanism for tipping the pan after a fixed number of vibrations and swiveling movements, a water-pipe through which water is supplied to the pans, a valve and mechanism which closes said valve and cuts off the flow of water before the pan tips and opens the valve after the pan is restored to its normal position, a hopper which feeds material to the pan, a gate which controls the outlet of the hopper, and mechanism which closes the gate before the pan tips and opens it after the pan is returned to its normal position, substantially as described.

6. In a panning and concentrating machine, in combination with a series of pans, a driving-shaft and intermediate mechanism operated thereby by which the pans are vibrated, intermediate mechanism actuated by said shaft whereby said pans are tipped after a fixed number of vibrations, a pipe through which water is supplied to the pans, cocks controlling the several outlets from the pipe to the pans, a pump connected with said pipe, an eccentric on said driving-shaft operating said pump, an eccentric on said shaft also connected by intermediate mechanism with the said cocks and so adjusted as to close the cocks when the pan tips and to open them when the pan resumes its normal position, substantially as described.

7. In a panning and concentrating machine, a pan, and a holder therefor, mechanism for vibrating the pan, and mechanism for tipping the pan, said mechanism comprising a rotating shaft, a cam on said shaft, a bell-crank lever pivoted on a fixed support, one arm of said bell-crank being engaged by said cam, the other arm of the bell-crank having a pin which engages with a slotted link, said link being secured to the pan-holding frame, substantially as described.

8. In a panning and concentrating machine, a multiple series of pans, each pan being axially pivoted on a supporting-frame, a plurality of reciprocating shafts, one for each series of pans, on which said supporting-frames and pans are mounted and which reciprocate together with said shafts, guides which cause the pans to swivel on their pivots in alternate directions simultaneously with their reciprocation, a plurality of rotating shafts coöperating, one for each series of pans, the rotating shafts having cams at alternate ends thereof, levers corresponding with said cams and pivoted in fixed supports, one arm of each lever engaging with the rotating cam and the other arm engaging loosely with one of the reciprocating shafts, the reciprocating shafts being connected together by levers which are pivoted in fixed supports and which are loosely jointed at both ends to the reciprocating shafts, all coöperating so that the reciprocating shafts and the pans are given a rapidly-reciprocating movement by means of the rotating shafts, cams and pivoted levers, substantially as described.

9. In a panning and concentrating machine, a series of pans, each pan being axially pivoted on a supporting-frame, a reciprocating shaft on which said supporting-frames and pans are mounted and which reciprocate together with said shafts, guides which cause the pans to swivel on their pivots in alternate directions simultaneously with their reciprocation, a driving-shaft having a cam thereon, a lever pivoted in a fixed support, one arm of said lever engaging with the rotating cam and the other arm engaging loosely with the reciprocating shaft, a second cam rotated by the driving-shaft, and a pivoted lever one arm of which engages with said cam and the other arm of which is connected by intermediate mechanism with the pan, all coöperating so that the pans are given a rapidly reciprocating and swiveling movement, and are tipped after a certain number of reciprocations and then restored to their normal positions, substantially as described.

10. In a panning and concentrating machine, a series of pans each pivoted on a supporting-frame, a reciprocating shaft on which said supporting-frames and pans are mounted, and which reciprocate with said shafts, guides which cause the pans to swivel on their pivots in alternate directions simultaneously with their reciprocation, a driving-shaft and a cam rotated thereby, a lever pivoted in a fixed support, one arm of said lever engaging with the rotating cam and the other arm engaging loosely with the reciprocating shaft, a second cam rotated by the driving-shaft, a pivoted lever one arm of which engages with said cam and the other arm of which is connected by intermediate mechanism with the pan, all coöperating so that the pans are given a rapidly reciprocating and swiveling movement and are tipped after a certain number of reciprocations and then restored to their normal positions, a gate which controls the supply of material to the pans, intermediate mechanism and a cam operated by the driving-shaft to open and close the gate, a water-pipe and a pump and an eccentric actuated by the driving-shaft to operate the pump, cocks in the pipes, intermediate mechanism and an eccentric actuated by the driving-shaft to open and close said cocks, all coöperating so that when the pans are tipped the flow of water to the pans is cut off and when the pans are restored to their normal position the cocks will be opened to admit the water, substantially as described.

JOHN H. COOMBS.

Witnesses:
EDITH J. ANDERSON,
OSCAR F. HILL.